(12) United States Patent
Roy

(10) Patent No.: US 11,675,736 B2
(45) Date of Patent: Jun. 13, 2023

(54) AUDITING INDIVIDUAL OBJECT OPERATIONS AS MULTIPLE FILE SYSTEM OPERATIONS

(71) Applicant: EMC IP Holding Company LLC, Hopkinton, MA (US)

(72) Inventor: Dipankar Roy, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 166 days.

(21) Appl. No.: 16/874,860

(22) Filed: May 15, 2020

(65) Prior Publication Data

US 2021/0357359 A1 Nov. 18, 2021

(51) Int. Cl.
| | |
|---|---|
| G06F 7/00 | (2006.01) |
| G06F 17/00 | (2019.01) |
| G06F 16/11 | (2019.01) |
| G06F 9/46 | (2006.01) |
| G06F 16/185 | (2019.01) |
| G06F 16/16 | (2019.01) |
| G06F 16/17 | (2019.01) |

(52) U.S. Cl.
CPC ............ *G06F 16/122* (2019.01); *G06F 9/466* (2013.01); *G06F 16/116* (2019.01); *G06F 16/16* (2019.01); *G06F 16/1734* (2019.01); *G06F 16/185* (2019.01)

(58) Field of Classification Search
None
See application file for complete search history.

(56) References Cited

U.S. PATENT DOCUMENTS

| | | | | |
|---|---|---|---|---|
| 2005/0278191 | A1* | 12/2005 | DiFalco | G06Q 10/06 705/1.1 |
| 2015/0143064 | A1* | 5/2015 | Bhargava | G06F 11/1464 711/162 |
| 2015/0163198 | A1* | 6/2015 | Moore | H04L 63/029 726/14 |
| 2018/0034892 | A1* | 2/2018 | Olsen | G06F 16/17 |
| 2019/0306173 | A1* | 10/2019 | Reddy | H04L 9/0637 |

* cited by examiner

*Primary Examiner* — Tuan A Pham
(74) *Attorney, Agent, or Firm* — Amin, Turocy & Watson, LLP

(57) ABSTRACT

Techniques are provided for auditing individual object operations as multiple file system operations. In an example, a client computer sends an object storage operation to a server that is configured to store data in a file system. The server receives the object storage operation, and converts it to one or more corresponding file system operations. The server opens an audit file context that identifies the object storage operation. As a file system driver reports that it has completed various file system operations corresponding to the object storage operation, the server appends an identification of the object storage operation, as determined from the audit file context, to an audit log entry for that file system operation.

20 Claims, 11 Drawing Sheets

AUDITING INDIVIDUAL OBJECT OPERATIONS AS MULTIPLE FILE SYSTEM OPERATIONS

TECHNICAL FIELD

The present application relates generally to logging and/or auditing operations that are performed on a computer file system.

BACKGROUND

A computer file system can perform operations on data that it stores, such as opening a new or existing file, writing data to an opened file, reading data from an opened file, and closing an opened file. In a file system, distinct pieces of data can be stored as files, and the files can be stored in a hierarchical directory. Another type of computer storage system can be object storage.

In an object storage system, data can be stored as an object that can comprise the data being stored, metadata about the data being stored, and a unique identifier for the object relative to other objects in the object storage system. That is, a difference between a file system storage and an object system storage is that, with a file system storage data can be stored hierarchically, and with object system storage, data can be stored in a flat address space.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
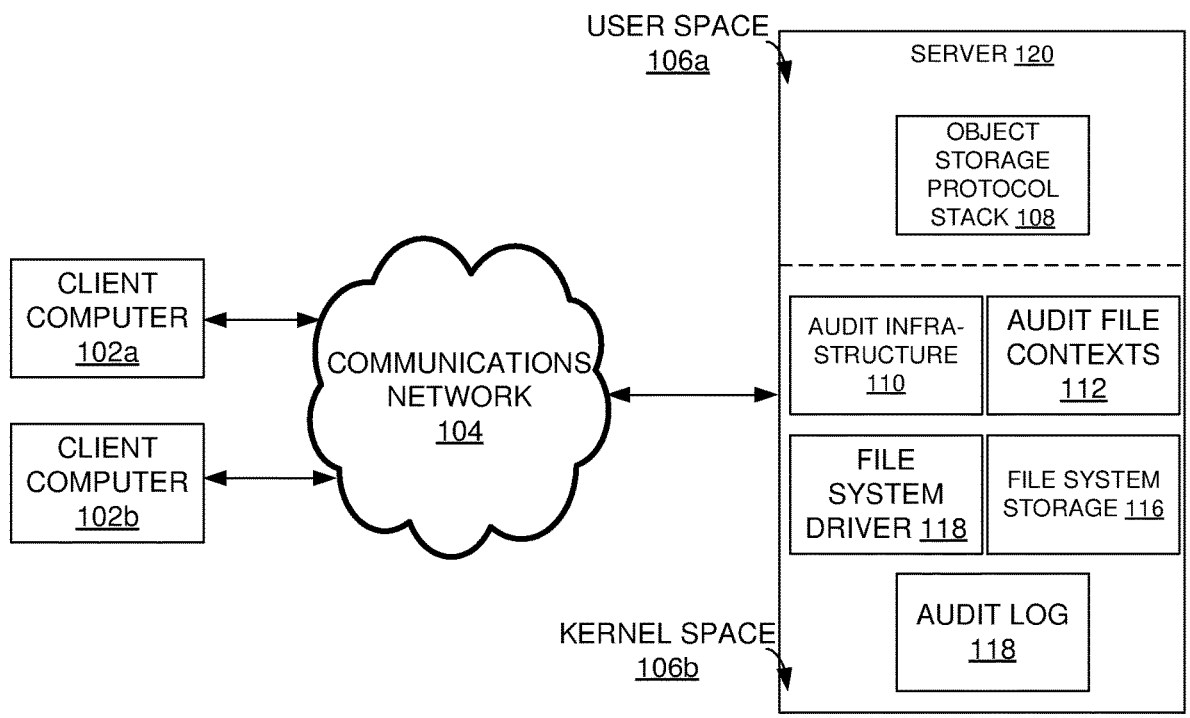
FIG. 1 illustrates an example system architecture that can facilitate auditing individual object operations as multiple file system operations, in accordance with certain embodiments of this disclosure.

A computer system can implement an object storage protocol stack on top of a file storage system (such as an ISILON ONEFS file storage system). In such an example, a client computer can send data operations to the computer system that specify object storage operations such as GET (to retrieve object contents and metadata), PUT (to create or replace an object), COPY (to copy an existing object to another object), and DELETE (to delete an existing object).

The protocol stack can receive these object storage operations, and convert each of them into one or more corresponding file system operations, such as OPEN (to create a new file or access an existing file), READ (to read the contents of a file), WRITE (to write to the contents of a file), and CLOSE (to close an opened file handle for a file). The protocol stack can then send these corresponding file system operations to a file system driver of the computer system, and the file system driver can implement these file system operations on a file system of the computer system.

In this manner, a client can specify object storage operations to a computer system that implements a file system, and these object storage operations can be effectuated on the file system.

As part of implementing an object storage protocol stack on top of a file storage system, the object storage operations can be stored in an audit log. Such an audit log can capture information such as the operation name, the operation type, the object name, the object location, and an identity and permissions of a user performing the operation.

One approach to perform such audit logging can be to create an application programming interface (API) that can collect this audit log information at the object storage protocol stack layer, and log the information into an audit file by calling into an audit subsystem that exists to store audit logging information for the file storage system and file storage operations.

A problem with this approach is that this audit logging can miss out on file system-level access or modifications that occur as part of implementing the audit operation. For example, a single object storage PUT operation can be implemented with multiple corresponding file system-level accesses or modifications. That is, in an example, a single object storage PUT operation can be implemented with the following multiple corresponding file system-level accesses or modifications:

(a) open and create one or more directories representing a bucket and prefixes for the object;
(b) access or set access control lists (ACLs) and permissions on these directories from (a);
(c) open a previously-created file, and read its ACL and contents;
(d) create a file that represents the object specified in the PUT operation;
(e) set ACLs and permissions on the file created in (d);
(f) write to the file created in (d);
(g) delete the previously-created file from (c);
(h) rename the newly written file from (f) to the name of the previously-created file from (c); and
(i) set extended attributes on the renamed file from (h).

In examples where only the object storage PUT operation is stored to a file log, without storing these file-system level accesses and modifications, it can be a problem to identify all the file system operations that resulted from the single object storage PUT operation. In some examples, it could be that a subset of these file system operations were successfully performed, while a subset of these file system operations were unsuccessfully performed, and the audit log fails to capture which were successfully performed and which were unsuccessfully performed.

A solution to this problem of audit logs for object operations implemented on a file system can be to identify and store in an audit log the file system operations performed corresponding to an object storage operation. These audit logs can co-exist with an existing auditing infrastructure for the file system (for protocols such as a Server Message Block (SMB) protocol, a Network File System (NFS) protocol, and a Hadoop Distributed File System (HDFS) protocol) with minimal or no impact.

Furthermore, a solution can involve auditing all file system operations resulting from each object operation in such a way that each file system operation has an individual audit log that can be associated with the parent object operation. That approach can involve appending a name of an object store operation (if present) to each of the file system operation audit logs that result from implementing the object operation. This approach can avoid changes to a pre-existing audit log format for protocols such as a NFS protocol, SMB protocol, and HDFS protocol, since it can avoid modifying a pre-existing field in the audit log.

In an example, the following approach can be taken to implement auditing individual object operations as multiple file system operations for object access on a file store:

When an object operation is to be performed on an object or a bucket, a file or directory can be opened via an object protocol stack sending an input/output request packet (IRP) to a file system driver. The IRP can be agnostic to the object operation. An identity of the object operation can be passed inside of the IRP by including it in special parameter (or extended attribute) of the IRP.

There can exist audit infrastructure that can intercept the IRP, perform an audit callback (sometimes referred to as a pre-op audit callback), and then hand the IRP off to the file system driver. The pre-op callback can extract the name (or another identifier) of the object operation from the IRP, and store it in an audit file context. In some examples, an audit file context can be created on each file or directory Open operation. The audit file context can be saved upon the Open operation completing successfully, and be maintained until the corresponding file or directory is closed. A file handle for a file can be mapped to an audit file context for that same file using an efficient lookup mechanism, such as a hash table. That is, a hash table can be maintained where a file handle can be used as a key to determine a corresponding audit file context.

After the Open operation returns from the file system, the audit infrastructure can perform another audit callback (sometimes referred to as a post-op audit callback) before sending an IRP reply to the protocol stack.

The post-op audit callback can examine the return status of the Open operation. If the Open operation was successful, the post-op audit callback can extract the object operation from the previously-created audit file context. The post-op audit callback can append the object operation to the audit log that has been generated for the corresponding file system operation.

Once the Open operation succeeds, a file handle for the file or directory can be available for further system operations that are generated by the parent object operation.

Each subsequent IRP performed with the same opened file handle can re-use the object operation that is stored in the audit file context. For each subsequent IRP (such as one for a Read or a Write file system operation, getting or setting attributes, or renaming or unlinking a file or folder), the corresponding audit log can be appended with the parent object operation in the post-op audit callback.

When a file or directory is closed, the corresponding audit file context is released after logging the object operation along with the Close operation.

A subsequent object store operation can again open a file or directory, and this sequence can repeat. In some examples, file handles are not shared between individual object store operations.

The following is an example audit log of a file system operation (here, a Read operation) that happens as part of a PUT object operation:

```
[Mon Dec 9 21:54:46 2019] {"id":"8402b1a5-1ace-11ea-b9eb-005056b60b48","timestamp":"1575928486857589","payloadType":"c411a642-c139-4c7a-be58-93680bc20b41","payload":{"protocol":"S3","zoneID":1,"zoneName":"System","eventType":"read","detailType":"read-file","isDirectory":false,"clientIPAddr":"10.7.180.84","filename":"\\ifs\foo.txt","userSID":"S-1-5-21-1953138770-3091759109-1787377831-1000","userID":2000,"bytesRead":4,"ntStatus":0,"fsId":1,"inode":4295231080}}
```

Then, this same audit log after appending the object operation information can appear as:

```
[Mon Dec 9 21:54:46 2019] {"id":"8402b1a5-1ace-11ea-b9eb-005056b60b48","timestamp":"1575928486857589","payloadType":"c411a642-c139-4c7a-be58-
```

```
93680bc20b41";"payload":{"protocol":"S3","zoneID":1,"zoneName":"System","eventType
":"read","detailType":"read-
file","isDirectory":false,"clientIPAddr":"10.7.180.84","filename":"\\ifs\foo.txt":"userSID":"
S-1-5-21-1953138770-3091759109-1787377831-
1000","userID":2000,"bytesRead":4,"ntStatus":0,"fsId":1,"inode":4295231080,"ObjectOp":"
put-object"}}
```

It can be appreciated that, in this example, no pre-existing data in the audit log is modified as part of appending the object operation to the audit log.

As seen above, the object operation is appended to the audit log as "ObjectOp":"put-object", while retaining other existing fields of the audit. Other file system operations resulting from the same PUT operation can be audited similarly. It can be appreciated that, in some examples, such as the one above, the object operation is not strictly appended to the audit log, because there are still two curly brackets ("}}") after it. Rather, in this example, the object operation is appended after the otherwise-last field in the audit log. In other examples, the object operation can be stored in other places within an audit log.

Example Architectures

FIG. 1 illustrates an example system architecture 100 that can facilitate auditing individual object operations as multiple file system operations, in accordance with certain embodiments of this disclosure. As depicted, system architecture comprises client computer 102a, client computer 102b, communications network 104, and server 120. In turn, server 120 can comprise user space 106a and kernel space 106b. Server 120 can also comprise object storage protocol stack 108 that operates in user space 106a. Server 120 can also comprise audit infrastructure 110, audit file contexts 112, file system driver 114, file system storage 116, and audit log 118 that operate in kernel space 106b.

Kernel space 106b can generally comprise a memory area of server 120 utilized by an operating system kernel and some device drivers of server 120, where these are effectuated with computer-readable instructions. Then, user space 106a can generally comprise a memory area of server 120 utilized by other components of server 120, where these other components are effectuated with computer-readable instructions.

Figure 11:
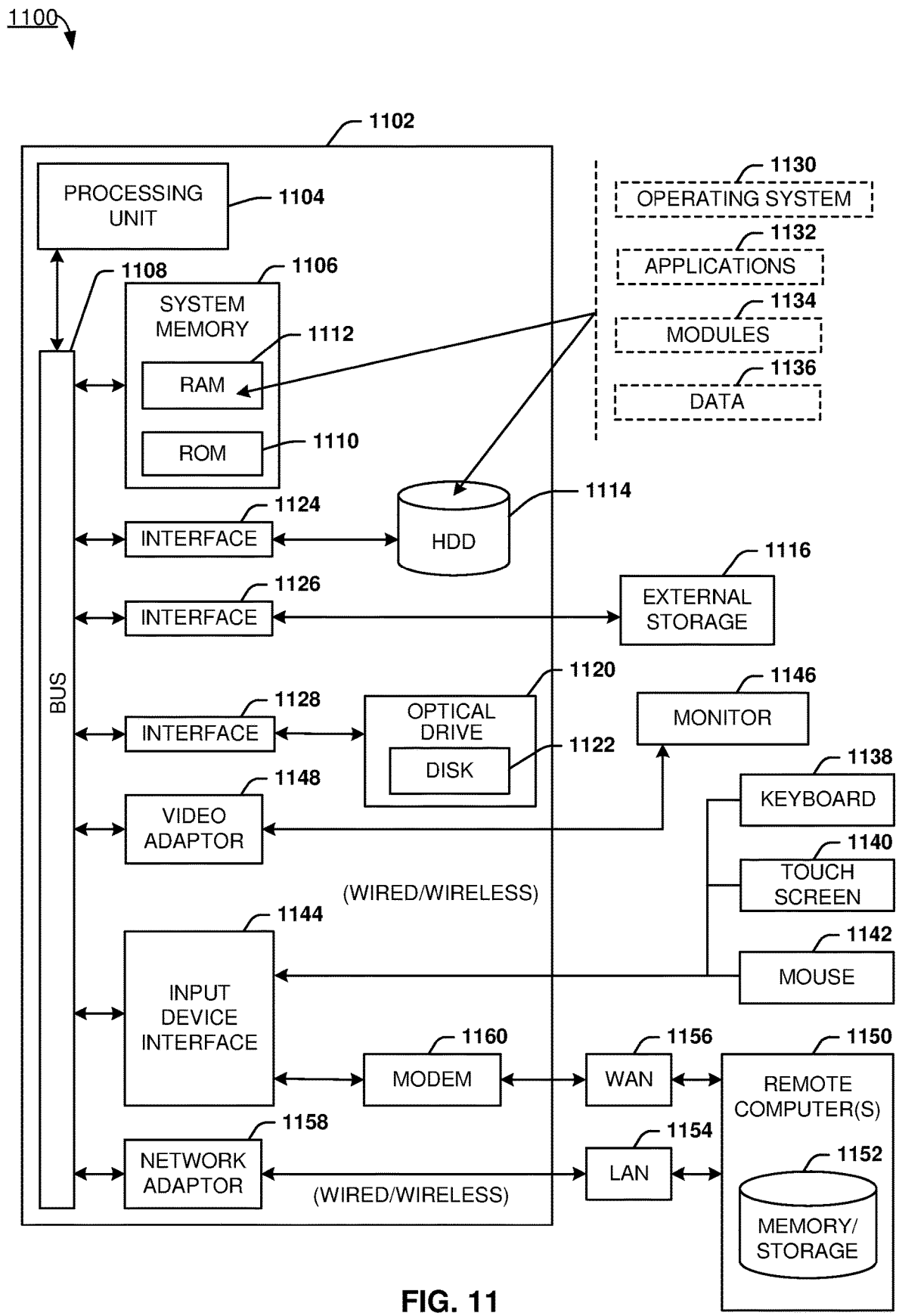
FIG. 11 illustrates an example block diagram of a computer operable to execute certain embodiments of this disclosure.

Each of client computer 102a, client computer 102b, and server 120 can be implemented with one or more instances of computer 1102 of FIG. 11. In some examples, server 120 comprises a distributed storage system that comprises multiple instances of computer 1102 of FIG. 11.

Communications network 104 can comprise a computer communications network, such as the INTERNET, or an isolated private computer communications network.

Each of client computer 102a and client computer 102b can send requests to server 120 to perform object storage operations on data (e.g., GET and PUT operations), and can send these requests via communications network 104.

Server 120 can be configured to store and operate on data in a file system storage. So, server 120 can receive these object storage operations from client computer 102a and client computer 102b, and effectuate corresponding file system operations. Server 120 can receive these object storage operations from client computer 102a and client computer 102b at object storage protocol stack 108.

Object storage protocol stack 108 can receive an object storage operation, and convert it into one or more file storage operations. Object storage protocol stack 108 can then send these file storage operations one at a time in an IRP that is directed to file system driver 114 (which can provide access to file system storage 116). This IRP that is directed to file system driver 114 can be intercepted by audit infrastructure 110. Audit infrastructure 110 can provide capabilities to log object storage operations in an audit log.

Audit infrastructure 110 can determine the object storage operation from an extended attribute of the IRP that stores it (where object storage protocol stack 108 set this extended attribute). Where the file system operation in this IRP is an OPEN operation (which can generally be a first file system operation generated from an object storage operation), audit infrastructure 110 can take this object storage operation and store it in an audit file context, which generally can comprise a computer memory structure.

After file system storage 116 performs the file system operation, file system driver 114 can create an audit log entry in audit log 118, and this audit log entry can be similar to the example audit log entry above. Audit log 118 can comprise computer storage, such as in memory or on disk. In some examples, audit log 118 can be stored in file system storage 116. File system driver 114 can also send an acknowledgement via an IRP that is directed to object storage protocol stack 108 (and that is intercepted by audit infrastructure 110) that the file system operation was successful. This acknowledgement can include a file handle for a file opened by file system storage 116.

Audit infrastructure 110 can receive this acknowledgment. In response, audit infrastructure can locate the audit log entry created by file system driver 114 in audit log 118, and append to it the name of the corresponding object storage operation. Audit infrastructure can retrieve the name of this object storage operation from the audit file context it created in audit file contexts 112. In response to receiving an acknowledgement that a file was successfully opened, the audit file context can be saved from a computer memory to persistent storage (and the audit file context can then be deleted from persistent storage after the file has been closed).

Then audit infrastructure 110 can pass the acknowledgement to object storage protocol stack 108. Object storage protocol stack 108 can determine a second file storage operation that corresponds to the one object storage operation, and send an IRP that is directed to file system driver 114 to effectuate this file storage operation. A similar set of techniques as with the initial file storage operation for an object storage operation can be implemented for this file storage operation, and for subsequent file storage operations that correspond to the object storage operation.

A file handle created can be used across multiple file storage operations that correspond to one object storage operation. In some example, a file handle is not recycled between multiple object storage operations that have corresponding file storage operations that operate on the same file. Similarly, an audit file context can be used across multiple file storage operations that correspond to one object storage operation.

Figure 2:
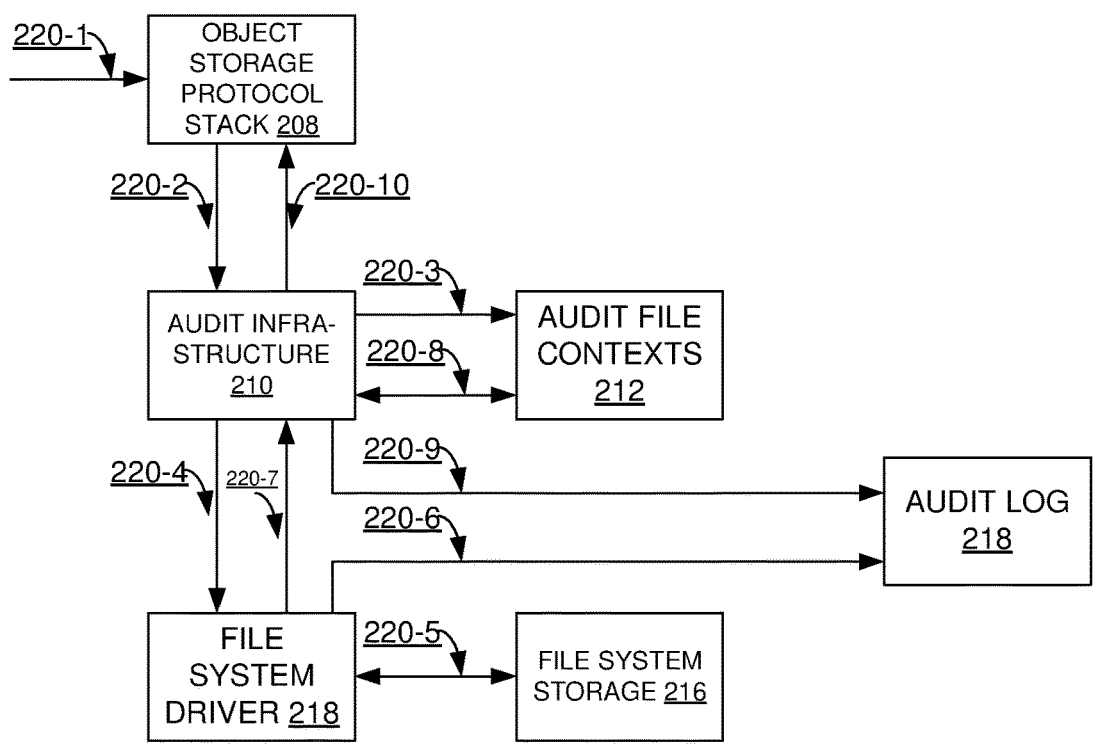
FIG. 2 illustrates another example system architecture that can facilitate auditing individual object operations as multiple file system operations, in accordance with certain embodiments of this disclosure.

FIG. 2 illustrates another example system architecture 200 that can facilitate auditing individual object operations as multiple file system operations, in accordance with certain embodiments of this disclosure. System architecture can be implemented with one or more instances of computer 1102 of FIG. 11. In some examples, system architecture 200 comprises a distributed storage system that comprises multiple instances of computer 1102 of FIG. 11.

The example of system architecture 200 can generally highlight a communications flow between different components to effectuate auditing individual object operations as multiple file system operations, in accordance with certain embodiments of this disclosure.

System architecture 200 comprises object storage protocol stack 208, audit infrastructure 210, audit file contexts 212, file system driver 214, file system storage 216, and audit log 218. In some examples, object storage protocol stack 208 can be similar to object storage protocol stack 108 of FIG. 1; audit infrastructure 210 can be similar to audit infrastructure 110 of FIG. 1; audit file contexts 212 can be similar to audit file contexts 112 of FIG. 1; file system driver 214 can be similar to file system driver 114 of FIG. 1; file system storage 216 can be similar to file system storage 116 of FIG. 1; and audit log 218 can be similar to audit log 118 of FIG. 1.

In the example of FIG. 2, communication 220-1 comprises a request to perform an object storage operation that is received by object storage protocol stack 208 from a client computer and across a communications network. In response, object storage protocol stack 208 sends an IRP 220-2 that indicates a corresponding file storage operation that is directed to file system driver 214 and intercepted by audit infrastructure 210.

Where the file storage operation is an OPEN operation, audit infrastructure 210 extracts the object storage operation from the IRP and sends it to be stored in audit file contexts via message 220-3. In examples where file storage operation is not an OPEN operation (so this file storage operation is being performed subsequent to an OPEN operation), then an audit file context can have already been created for the object storage operation, and message 220-3 can be omitted.

Audit file infrastructure can then pass the IRP 220-4 to file system driver 214. File system driver can then instruct 220-5 file system storage 216 to perform the file system operation indicated by IRP 220-4, and receive an acknowledgment in turn.

File system driver 214 can the store 220-6 an audit log entry for this file system operation in audit log 218. File system driver 214 can also then send an IRP 220-7 that is directed to object storage protocol stack 208 and that is intercepted by audit infrastructure 210. Audit infrastructure can retrieve 220-8 the audit file context from audit file contexts 212, and append 220-9 the object storage operation from the retrieved audit file context in the entry for the corresponding file system operation in audit log 218.

Where the file system operation is an OPEN operation, in 220-8, audit infrastructure 210 can also save the audit file context. Where the file system operation is a CLOSE operation, in 220-8, audit infrastructure 210 can delete the audit file context after retrieving the object storage operation from it.

Audit infrastructure 210 can then pass 220-10 the IRP from file system driver 214 back to object storage protocol stack 208. Where there are more file system operations to perform for the object storage operation of 220-1, object storage protocol stack 208 can initiate a similar communications flow for another file system operation. In these subsequent file system operations for a particular object storage operation, a file handle returned by file system driver 214 in IRP 220-7 can be utilized and referenced by object storage protocol stack.

Example Process Flows

Figure 3:
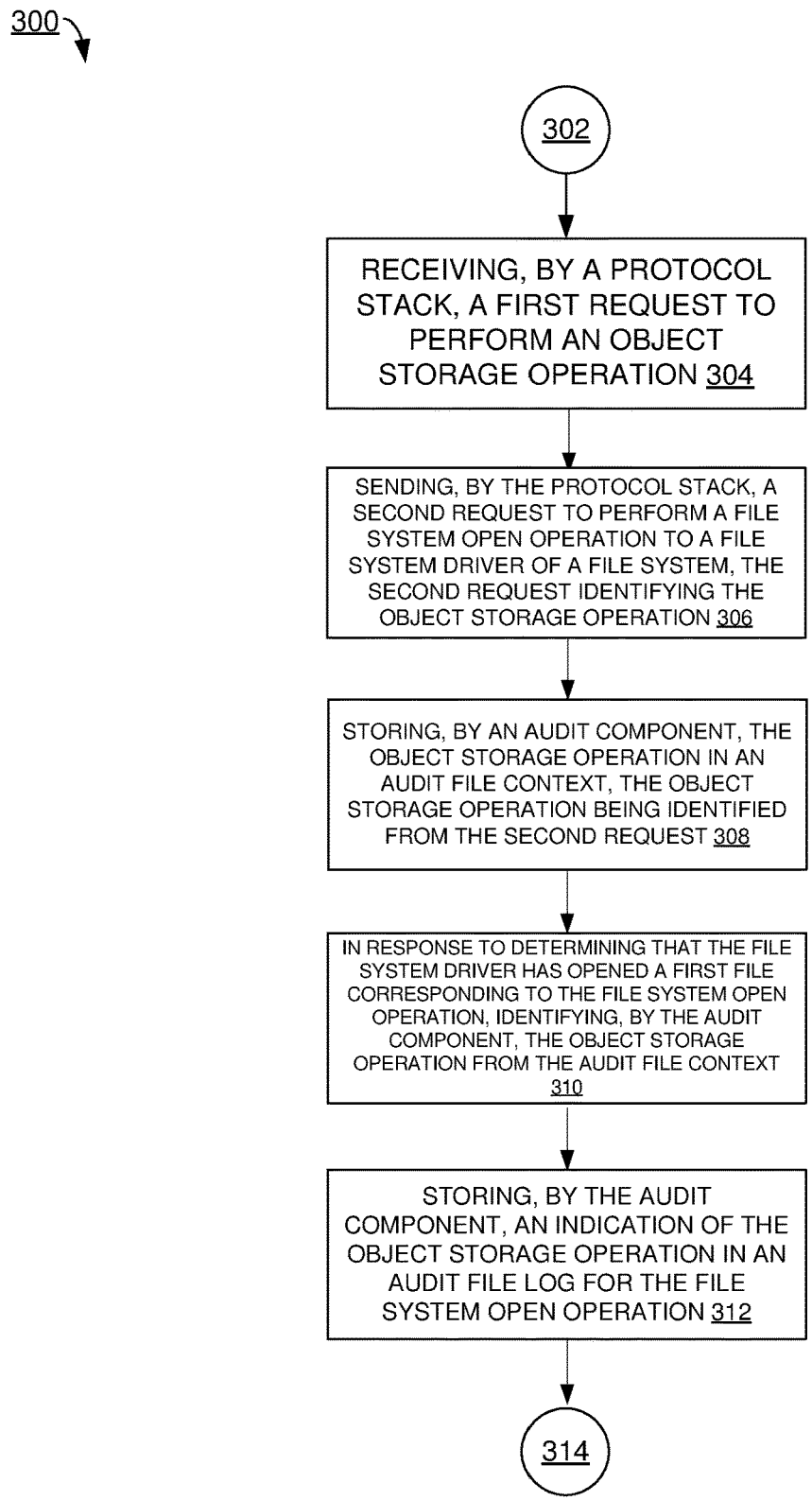
FIG. 3 illustrates an example process flow that can facilitate auditing individual object operations as multiple file system operations, in accordance with certain embodiments of this disclosure.

FIG. 3 illustrates an example process flow 300 that can facilitate auditing individual object operations as multiple file system operations, in accordance with certain embodiments of this disclosure. In some examples, aspects of process flow 300 can be implemented by server 120 of FIG. 1, system architecture 200 of FIG. 2, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 300 begins with 302, and moves to operation 304.

Operation 304 depicts receiving, by a protocol stack, a first request to perform an object storage operation. In some examples, the protocol stack can be object storage protocol stack 108 of FIG. 1, and the first request can be received from client computer 102a and via communications network 104.

In some examples, the object storage operation is configured to operate on object storage, and the object storage is configured to manage data in the form of objects. This can be viewed in contrast to a file storage operation that is configured to operate on a file system, where the file system is configured to manage data in the form of files in a file structure. After operation 304, process flow 300 moves to operation 306.

Operation 306 depicts sending, by the protocol stack, a second request to perform a file system open operation to a file system driver of a file system, the second request identifying the object storage operation. The protocol stack can be object storage protocol stack 108n of FIG. 1, the file system driver can be file system driver 114 of FIG. 1, and the file system can be file system storage 116 of FIG. 1. The second request can be an IRP, such as IRP 220-2 of FIG. 2.

In some examples, the second request comprises an IRP, and the object storage operation is identified in an extended attribute of the IRP. The IRP itself can identify the file system operation that is to be performed by the file system driver, and then an extended attribute of the IRP can identify the object storage operation that corresponds to the file system operation.

In some examples, the protocol stack operates in a user space of the system, and the file system driver operates in a kernel space of the system. This can be user space 106a of FIG. 1 and kernel space 106b of FIG. 1.

In some examples, the file system is configured to manage data in the form of a file hierarchy. This file hierarchy for data storage can be viewed in contrast to object storage, which can omit a file hierarchy.

After operation 306, process flow 300 moves to operation 308.

Operation 308 depicts storing, by an audit component, the object storage operation in an audit file context, the object storage operation being identified from the second request.

The audit component can be audit infrastructure 110 of FIG. 1, and the audit file context can be stored in audit file contexts 112 of FIG. 1. In some examples, the audit file context comprises a computer memory location that stores an indication of the object storage operation.

In some examples, operation 308 comprises intercepting, by the audit component, the second request as the second request is sent by the protocol stack and to the file system driver. After operation 308, process flow 300 moves to operation 310.

Operation 310 depicts, in response to determining that the file system driver has opened a first file corresponding to the file system open operation, identifying, by the audit component, the object storage operation from the audit file context. In some examples, this can comprise audit infrastructure 210 of FIG. 2 having communication 220-8 with audit file contexts 212.

In some examples, operation 310 comprises intercepting, by the audit component, a first message indicative of the first file being opened that is originated by the file system driver and sent to the protocol stack. The file system driver can be file system driver 214 of FIG. 2, and the protocol stack can be object storage protocol stack 208.

In some examples, operation 310 comprises sending, by the file system driver, a file system handle to the protocol stack, the file system handle identifying the first file. Where a file system driver performs an OPEN file operation, it can also determine a file handle that can be used to refer to this opened file, and return this file handle to the protocol stack. The protocol stack can reference this file handle in sending subsequent file system operations to the file system driver that correspond to the object storage operation.

After operation 310, process flow 300 moves to operation 312.

Operation 312 depicts storing, by the audit component, an indication of the object storage operation in an audit file log for the file system open operation. As part of performing the file system operation, the file system driver can create an audit log entry for the operation, such as in audit log 218 of FIG. 2.

Then, the audit component can append to this audit log entry the name of the corresponding object operation, which it retrieved from the corresponding audit file context. In some examples, this can comprise appending, by the audit log, the indication of the object storage operation to the audit file log for the file system operation.

In some examples, the object storage operation corresponds to the file system open operation and to a second file system operation corresponds, and operation 312 comprises sending, by the protocol stack, a third request to perform the second file system operation to the file system driver, the third request identifying the file handle. That is, after the first file system operation that corresponds to the object storage operation is performed, a second file system operation that corresponds to the object storage operation can be initiated and performed.

In some examples, operation 312 comprises after the file system driver has performed the second file system operation, storing, by the audit component, an indication of the object storage operation in an audit file log for the second file system operation, the object storage operation being identified from the audit file context. That is, the audit file context can be saved upon success of a corresponding file OPEN operation.

In some examples, operation 312 comprises, in response to receiving, by the protocol stack, a third request to perform a second object storage operation that corresponds to the first file, opening a second file handle for the first file. That is, a file handle can be reused for multiple file system operations that correspond to one object storage operation. Where a second object storage operation is to be implemented, then a second file handle can be determined, even when both object storage operations result in operating on the same file.

In some examples, a first file handle is opened in response to the opening of the first file, and operation 312 comprises opening a second audit file context in response to a second file handle being opened as part of carrying out a second object storage operation. Similarly, to the above regarding file handles, it can be that an audit file context is shared between multiple file system operations that correspond to one object storage operation. And then, a separate audit file context can be created for each object storage operation.

After operation 312, process flow 300 moves to 314, where process flow 300 ends.

Figure 4:
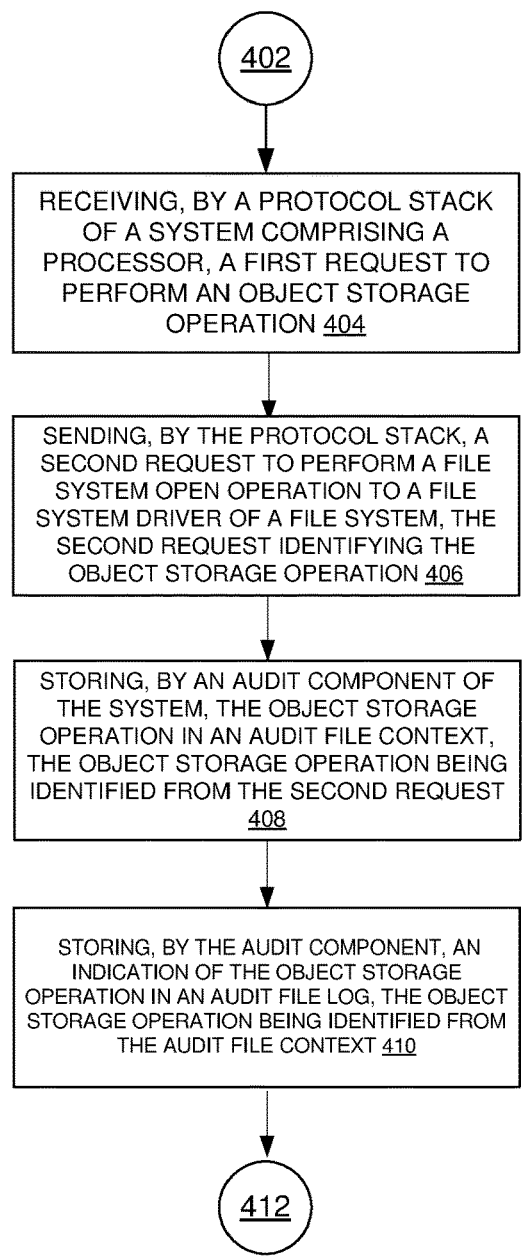
FIG. 4 illustrates another example process flow that can facilitate auditing individual object operations as multiple file system operations, in accordance with certain embodiments of this disclosure.

FIG. 4 illustrates another example process flow 400 that can facilitate auditing individual object operations as multiple file system operations, in accordance with certain embodiments of this disclosure. In some examples, aspects of process flow 400 can be implemented by server 120 of FIG. 1, system architecture 200 of FIG. 2, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 300 of FIG. 3, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 400 begins with 402, and moves to operation 404.

Operation 404 depicts receiving, by a protocol stack of a system comprising a processor, a first request to perform an object storage operation. In some examples, operation 404 can be implemented in a similar manner as operation 304 of FIG. 3. After operation 404, process flow 400 moves to operation 406.

Operation 406 depicts sending, by the protocol stack, a second request to perform a file system open operation to a file system driver of a file system, the second request identifying the object storage operation. In some examples, operation 406 can be implemented in a similar manner as operation 306 of FIG. 3. After operation 406, process flow 400 moves to operation 408.

Operation 408 depicts storing, by an audit component of the system, the object storage operation in an audit file context, the object storage operation being identified from the second request. In some examples, operation 408 can be implemented in a similar manner as operation 308 of FIG. 3, After operation 408, process flow 400 moves to operation 410.

Operation 410 depicts after the file system driver has opened a first file corresponding to the file system open operation, storing, by the audit component, an indication of the object storage operation in an audit file log for the file system open operation, the object storage operation being identified from the audit file context. In some examples, operation 410 can be implemented in a similar manner as operation 310 and operation 312 of FIG. 3. After operation 410, process flow 400 moves to 412, where process flow 400 ends.

Figure 5:
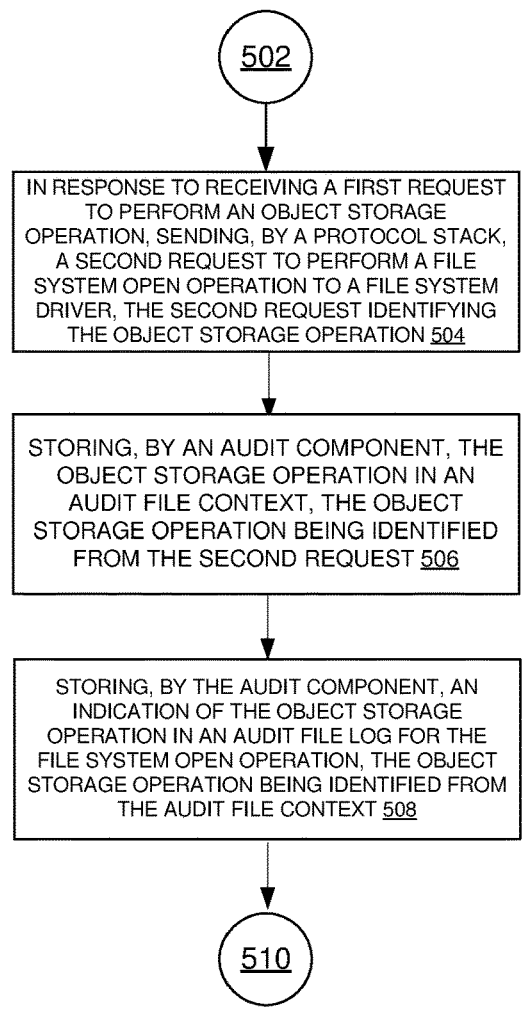
FIG. 5 illustrates another example process flow that can facilitate auditing individual object operations as multiple file system operations, in accordance with certain embodiments of this disclosure.

FIG. 5 illustrates another example process flow 500 that can facilitate auditing individual object operations as multiple file system operations, in accordance with certain embodiments of this disclosure. In some examples, aspects of process flow 500 can be implemented by server 120 of FIG. 1, system architecture 200 of FIG. 2, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 300 of FIG. 3, process flow 400 of FIG. 4, process flow 600 of FIG. 6, process flow 700 of FIG. 7, process flow 800 of FIG. 8, process flow 900 of FIG. 9, and process flow 1000 of FIG. 10.

Process flow 500 begins with 502, and moves to operation 504.

Operation 504 depicts, in response to receiving a first request to perform an object storage operation, sending, by a protocol stack, a second request to perform a file system open operation to a file system driver of a file system, the second request identifying the object storage operation. In some examples, operation 504 can be implemented in a similar manner as operation 304 and operation 306 of FIG. 3. After operation 504, process flow 500 moves to operation 506.

Operation 506 depicts storing, by an audit component, the object storage operation in an audit file context, the object storage operation being identified from the second request. In some examples, operation 506 can be implemented in a similar manner as operation 308 of FIG. 3. After operation 506, process flow 500 moves to operation 508.

Operation 508 depicts after the file system driver has opened a first file corresponding to the file system open operation, storing, by the audit component, an indication of the object storage operation in an audit file log for the file system open operation, the object storage operation being identified from the audit file context. In some examples, operation 508 can be implemented in a similar manner as operation 310 and operation 312 of FIG. 3. After operation 508, process flow 500 moves to 510, where process flow 500 ends.

Figure 6:
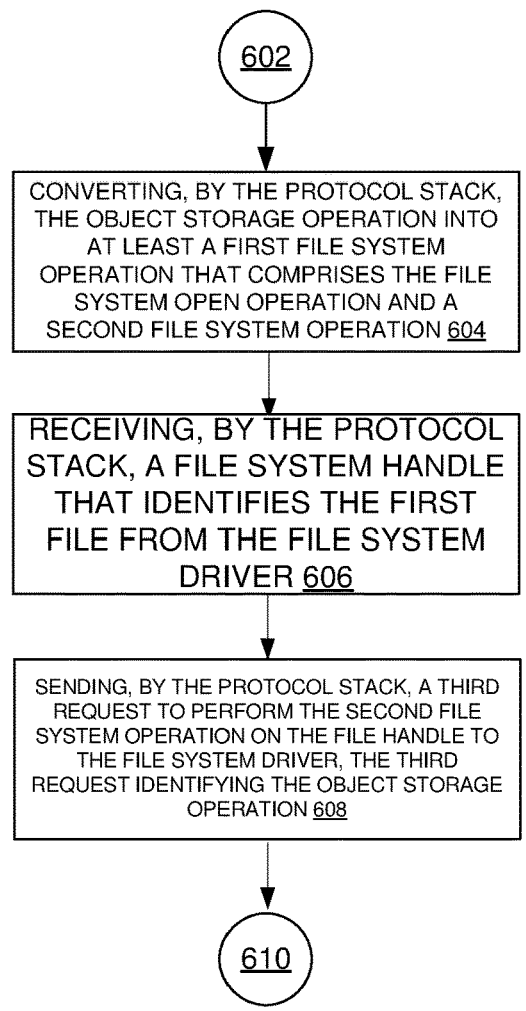
FIG. 6 illustrates another example process flow that can facilitate auditing individual object operations as multiple file system operations, in accordance with certain embodiments of this disclosure.

FIG. 6 illustrates another example process flow 600 that can facilitate auditing individual object operations as multiple file system operations, in accordance with certain embodiments of this disclosure. In some examples, aspects of process flow 600 can be implemented by server 120 of FIG. 1, system architecture 200 of FIG. 2, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 300 of FIG. 3, process flow 400 of FIG. 4, process flow 500 of FIG. 5, process flow 700 of FIG. 7, process flow 800 of FIG. 8, process flow 900 of FIG. 9, and process flow 1000 of FIG. 10.

Process flow 600 begins with 602, and moves to operation 604.

Operation 604 depicts converting, by the protocol stack, the object storage operation into at least a first file system operation that comprises the file system open operation and a second file system operation. For instance, one object storage operation can correspond to an OPEN file system operation, a series of one or more intermediary file system operations, and a CLOSE file system operation. This correspondence can indicate a series of file system operations that effectuate on a file system a data manipulation that is indicated by the object storage operation.

In some examples, the protocol stack can comprise object storage protocol stack 108 of FIG. 1. After operation 604, process flow 600 moves to operation 606.

Operation 606 depicts receiving, by the protocol stack, a file system handle that identifies the first file from the file system driver. As part of opening a file as part of an OPEN operation, a file system driver (such as file system driver 114 of FIG. 1) can determine a file handle for the opened file. The file system driver can return this file handle as part of an IRP to the protocol stack, and the protocol stack can reference this file handle in issuing subsequent file system operations to the file system driver that correspond to the object storage operation. After operation 606, process flow 600 moves to operation 608.

Operation 608 depicts sending, by the protocol stack, a third request to perform the second file system operation on the file handle to the file system driver, the third request identifying the object storage operation. The third request can be for a second file system operation that corresponds to the object storage operation, and it can reference the file handle.

It can be appreciated that, in some examples such as the one of process flow 600, a file handle is re-used between multiple file system operations that correspond to one object storage operation. And in such examples, file handles are not re-used between the file system operations of different object storage operations. That is, a separate file handle can be determined for each object storage operation. After operation 608, process flow 600 moves to 610, where process flow 600 ends.

Figure 7:
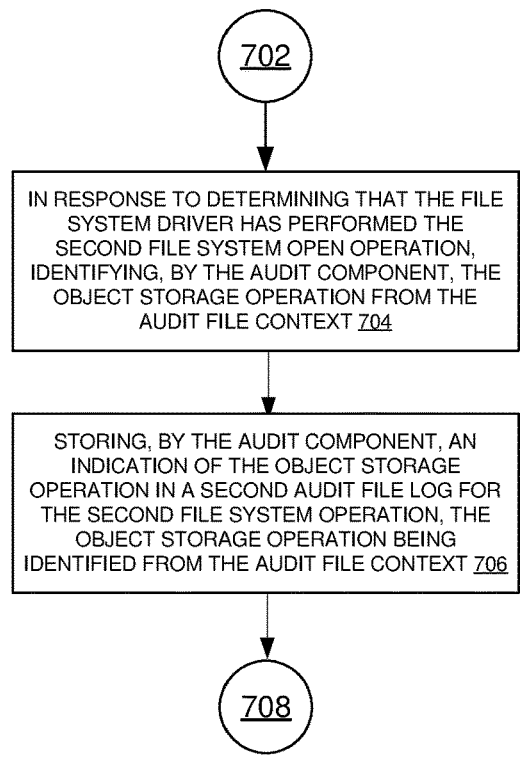
FIG. 7 illustrates an example process flow that can facilitate re-using an audit file context as part of auditing individual object operations as multiple file system operations, in accordance with certain embodiments of this disclosure.

FIG. 7 illustrates an example process flow 700 that can facilitate re-using an audit file context as part of auditing individual object operations as multiple file system operations, in accordance with certain embodiments of this disclosure. In some examples, aspects of process flow 700 can be implemented by server 120 of FIG. 1, system architecture 200 of FIG. 2, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 300 of FIG. 3, process flow 400 of FIG. 4, process flow 500 of FIG. 5, process flow 600 of FIG. 6, process flow 800 of FIG. 8, process flow 900 of FIG. 9, and process flow 1000 of FIG. 10.

Process flow 700 begins with 702, and moves to operation 704.

Operation 704 depicts, in response to determining that the file system driver has performed the second file system open operation, identifying, by the audit component, the object storage operation from the audit file context. That is, the object storage operation can be stored in an audit file context. When the file system driver completes a file system operation, the corresponding object storage operation can be retrieved from its audit file context, and that retrieved object storage operation can be used to append the object storage operation to an audit log entry for the file storage operation. After operation 704, process flow 700 moves to operation 706.

Operation 706 depicts storing, by the audit component, an indication of the object storage operation in a second audit file log for the second file system operation, the object storage operation being identified from the audit file context. That is, the one audit file context can be used to store the object storage operation for multiple file system operations that correspond to the object storage operation. The object storage operation can be retrieved from the audit file context each time a corresponding file system operation is performed, and used to append the object storage operation to an audit log for each of these file system operations.

It can be appreciated that, in some examples such as the one of process flow 700, an audit file context is re-used between multiple file system operations that correspond to one object storage operation. And in such examples, audit file contexts are not re-used between the file system operations of different object storage operations. That is, a separate audit file context can be determined for each object storage operation. After operation 706, process flow 700 moves to 708, where process flow 700 ends.

Figure 8:
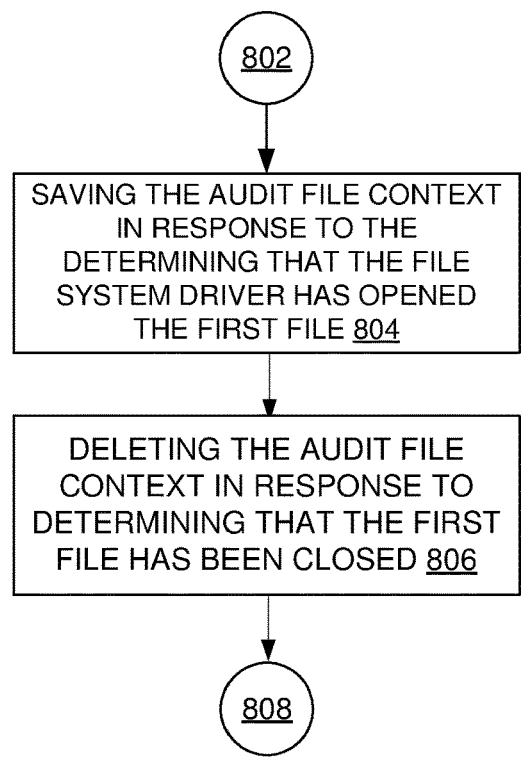
FIG. 8 illustrates an example process flow that can facilitate creating and deleting an audit file context as part of auditing individual object operations as multiple file system operations, in accordance with certain embodiments of this disclosure.

FIG. 8 illustrates an example process flow 800 that can facilitate creating and deleting an audit file context as part of auditing individual object operations as multiple file system operations, in accordance with certain embodiments of this disclosure. In some examples, aspects of process flow 800 can be implemented by server 120 of FIG. 1, system architecture 200 of FIG. 2, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 900 of FIG. 9, and process flow 1000 of FIG. 10.

Process flow 800 begins with 802, and moves to operation 804.

Operation 804 depicts saving the audit file context in response to the determining that the file system driver has opened the first file. An audit file context can be generated in response to an audit infrastructure (e.g., audit infrastructure 110 of FIG. 1) intercepting an IRP from an object storage protocol stack (e.g., object storage protocol stack 108 of FIG. 1) that includes an OPEN file system operation. The identity of the object storage operation can be contained in an extended attribute of this IRP.

A generated audit file context can be saved (such as from computer memory to persistent computer storage, like disk storage) where the file system driver has successfully performed an OPEN operation, and sent an IRP indicative of that to the object storage protocol stack. The audit infrastructure can intercept this IRP, and then save the audit file context in response to determining that the OPEN was successful. After operation 804, process flow 800 moves to operation 806.

Operation 806 depicts deleting the audit file context in response to determining that the first file has been closed. An object storage operation can be implemented by a series of file system operations that concludes with a file CLOSE operation. When the audit infrastructure intercepts an IRP from the file system driver indicative of a file CLOSE operation being performed, the audit infrastructure can delete a corresponding audit file context. Deleting an audit file context can comprise removing it from computer storage, or otherwise indicating that an area of computer storage that corresponds to the audit file context is free to be written to.

An audit file context can be deleted in response to a CLOSE operation being performed, because the CLOSE operation can indicate that there are no more file system operations to perform that correspond to a particular object storage operation. After operation 806, process flow 800 moves to 808, where process flow 800 ends.

Figure 9:
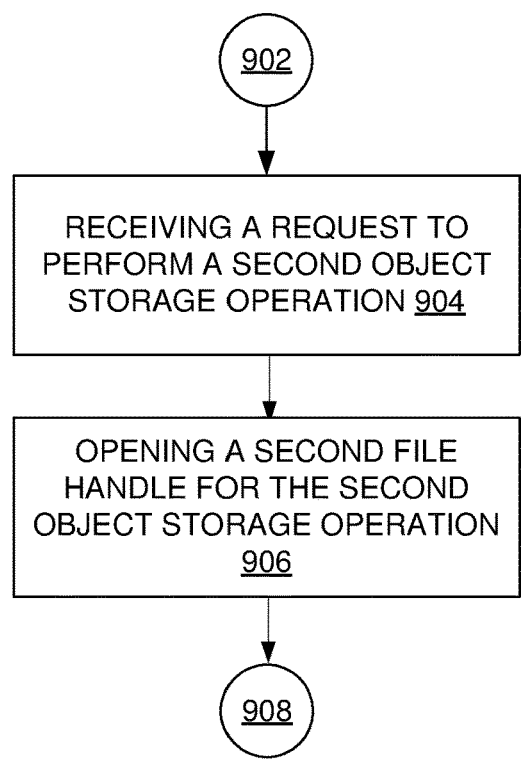
FIG. 9 illustrates an example process flow that can facilitate processing multiple object operations as part of auditing individual object operations as multiple file system operations, in accordance with certain embodiments of this disclosure.

FIG. 9 illustrates an example process flow 900 that can facilitate processing multiple object operations as part of auditing individual object operations as multiple file system operations, in accordance with certain embodiments of this disclosure. In some examples, aspects of process flow 900 can be implemented by server 120 of FIG. 1, system architecture 200 of FIG. 2, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and process flow 1000 of FIG. 10.

Process flow 900 begins with 902, and moves to operation 904.

Operation 904 depicts receiving a request to perform a second object storage operation. One or more client computers (such as client computer 102a and/or client computer 102b of FIG. 1) can send multiple requests to perform an object storage operation to a server (such as server 120 of FIG. 1). Where a request to perform a first object storage operation has already been received, a request to perform a second object storage operation can then be received. After operation 904, process flow 900 moves to operation 906.

Operation 906 depicts opening a second file handle for the second object storage operation. In some examples, each object storage operation can have a separate file handle. A file handle for an object storage operation can be determined and opened by a file system driver (such as file system driver 114 of FIG. 1) as part of effectuating an OPEN file system operation.

And an OPEN file system operation can be a first file system operation that is sent to the file system driver for each object storage operation. An object storage protocol stack can then reference a file handle in sending additional file system operations that correspond to a particular object storage operation subsequent to sending the OPEN file system operation. After operation 906, process flow 900 moves to 908, where process flow 900 ends.

Figure 10:
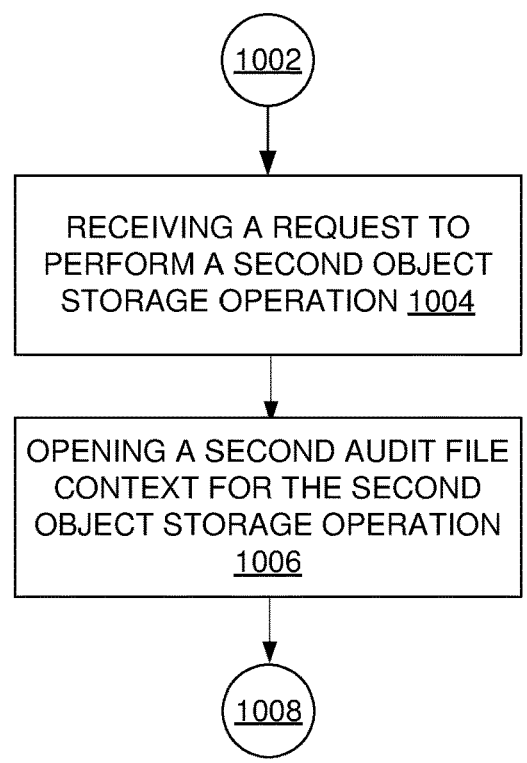
FIG. 10 illustrates another example process flow that can facilitate processing multiple object operations as part of auditing individual object operations as multiple file system operations, in accordance with certain embodiments of this disclosure.

FIG. 10 illustrates another example process flow 1000 that can facilitate processing multiple object operations as part of auditing individual object operations as multiple file system operations, in accordance with certain embodiments of this disclosure. In some examples, aspects of process flow 1000 can be implemented by server 120 of FIG. 1, system architecture 200 of FIG. 2, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and process flow 900 of FIG. 9.

Process flow 1000 begins with 1002, and moves to operation 1004.

Operation 1004 depicts receiving a request to perform a second object storage operation. In some examples, operation 1004 can be implemented in a similar manner as operation 904 of FIG. 9. After operation 1004, process flow 1000 moves to operation 1006.

Operation 1006 depicts opening a second audit file context for the second object storage operation. An audit infrastructure (e.g., audit infrastructure 110 of FIG. 1) can open an audit file context in response to intercepting an IRP from an object storage protocol stack (e.g., object storage protocol stack 108 of FIG. 1) that contains an OPEN file system operation.

In some examples, an OPEN file system operation can be the first file system operation that corresponds to an object storage operation. And in these examples, subsequent file system operations that correspond to the object storage operation are not OPEN file system operations. So, by opening an audit file context in response to an OPEN file system operation, a separate audit file context can be created for each object storage operation.

The audit file context can indicate the object storage operation, and the object storage operation can be determined from an extended attribute of the IRP that indicates the object storage operation. After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102*a*, client computer 102*b*, and/or server 120 of FIG. 1. Aspects of computing environment 1100 can be used to implement aspects of system architecture 200 of FIG. 2. In some examples, computing environment 1100 can implement aspects of the process flows of FIGS. 3-10 to facilitate auditing individual object operations as multiple file system operations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including, a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving, by a protocol stack, a first request to perform an object storage operation according to an object storage protocol that is configured to operate on data as objects;
sending, by the protocol stack to a file system driver of a file system, a second request to perform a file system open operation to open a first file, the second request identifying the object storage operation, and wherein the file system driver is configured to operate on data that is represented as one or more files in a hierarchical directory;
storing, by an audit component, a first indication of the object storage operation in an audit file context, the object storage operation being identified from the second request;
in response to determining that the file system driver has processed at least part of the object storage operation by implementing the file system open operation to open the first file, identifying, by the audit component, the object storage operation from the audit file context; and
storing, by the audit component, a second indication of the object storage operation in an audit file log for the file system open operation.

2. The system of claim 1, wherein the operations further comprise:
converting, by the protocol stack, the object storage operation into at least a first file system operation that comprises the file system open operation and a second file system operation to open a second file.

3. The system of claim 2, wherein the operations further comprise:
receiving, by the protocol stack, a file system handle that identifies the first file from the file system driver; and
sending, by the protocol stack, a third request to perform the second file system operation on the file system handle to the file system driver, the third request identifying the object storage operation.

4. The system of claim 3, wherein the operations further comprise:
in response to determining that the file system driver has performed the second file system operation, identifying, by the audit component, the object storage operation from the audit file context; and
storing, by the audit component, a third indication of the object storage operation in a second audit file log for the second file system operation, the object storage operation being identified from the audit file context.

5. The system of claim 1, wherein the second request comprises an input/output request packet, and wherein the object storage operation is identified in an extended attribute of the input/output request packet.

6. The system of claim 1, wherein the operations further comprise:
saving the audit file context in response to the determining that the file system driver has opened the first file; and
deleting the audit file context in response to determining that the first file has been closed.

7. The system of claim 1, wherein the determining that the file system driver has opened the first file comprises:
intercepting, by the audit component, a first message indicative of the first file being opened that is originated by the file system driver and sent to the protocol stack.

8. The system of claim 1, wherein the operations further comprise:
in response to performing a file system close operation that corresponds to the file system open operation,
storing, by the audit component, a third indication of the file system close operation with the first indication of the object storage operation in the audit file context, and
releasing, by the audit component, the audit file context.

9. The system of claim 1, wherein the object storage operation is a first object storage operation, wherein the file system open operation references a first file handle, wherein a group of object storage operations comprises the first object storage operation, and wherein respective object storage operations of the group of object storage operations reference respective different file handles.

10. The system of claim 1, wherein the storing, by the audit component, of the second indication of the object storage operation in the audit file log for the file system open operation comprises:

identifying an audit log entry of the audit file log that identifies the file system open operation; and adding the second indication of the object storage operation to the audit file log.

11. A method, comprising:

receiving, by a protocol stack of a system comprising a processor, a first request to perform an object storage operation according to an object storage protocol that is configured to operate on data as objects;

sending, by the protocol stack to a file system driver of a file system, a second request to perform a file system open operation to open a first file, the second request identifying the object storage operation, and wherein the file system driver is configured to operate on data that is represented as one or more files in a hierarchical directory;

storing, by an audit component of the system, the object storage operation in an audit file context, the object storage operation being identified from the second request; and after the file system driver has processed at least part of the object storage operation by implementing the file system open operation to open the first file, storing, by the audit component, an indication of the object storage operation in an audit file log for the file system open operation, the object storage operation being identified from the audit file context.

12. The method of claim 11, wherein the storing the indication of the object storage operation in the audit file log comprises:

appending, by the audit component, the indication of the object storage operation to the audit file log for the file system open operation.

13. The method of claim 11, further comprising:

sending, by the file system driver, a file system handle to the protocol stack, the file system handle identifying the first file.

14. The method of claim 13, wherein the object storage operation corresponds to the file system open operation and to a second file system operation to open a second file, and further comprising:

sending, by the protocol stack, a third request to perform the second file system operation to the file system driver, the third request identifying the file system handle.

15. The method of claim 14, further comprising:

after the file system driver has performed the second file system operation, storing, by the audit component, the indication of the object storage operation in the audit file log for the second file system operation, the object storage operation being identified from the audit file context.

16. The method of claim 11, further comprising:

in response to receiving, by the protocol stack, a third request to perform a second object storage operation that corresponds to the first file, opening a second file handle for the first file.

17. A non-transitory computer-readable medium comprising instructions that, in response to execution, cause a system comprising a processor to perform operations, comprising:

in response to receiving a first request to perform an object storage operation according to an object storage protocol that is configured to operate on data as objects, sending, by a protocol stack to a file system driver of a file system, a second request to perform a file system open operation to open a file, the second request identifying the object storage operation, and wherein the file system driver is configured to operate on data that is represented as one or more files in a hierarchical directory;

storing, by an audit component, the object storage operation in an audit file context, the object storage operation being identified from the second request; and after the file system driver has processed at least part of the object storage operation by implementing the file system open operation to open the file, storing, by the audit component, an indication of the object storage operation in an audit file log for the file system open operation, the object storage operation being identified from the audit file context.

18. The non-transitory computer-readable medium of claim 17, wherein the operations further comprise:

intercepting, by the audit component, the second request as the second request is sent by the protocol stack and to the file system driver.

19. The non-transitory computer-readable medium of claim 17, wherein the object storage operation is configured to operate on object storage, and wherein the object storage is configured to manage data in the form of objects.

20. The non-transitory computer-readable medium of claim 17, wherein a first file handle is opened in response to the file being opened, and wherein the operations further comprise:

opening a second audit file context in response to a second file handle being opened as part of carrying out a second object storage operation.

* * * * *